March 13, 1973     T. D. VERTIN     3,720,114
MACHINE ELEMENT DRIVE MEANS INCLUDING A GEAR
RACK ASSEMBLY OF INDIVIDUAL SQUARE TEETH
Filed Feb. 16, 1971     3 Sheets-Sheet 1

INVENTOR.
THOMAS D. VERTIN
BY
Donnelly, Mentag & Herrington
ATTORNEYS

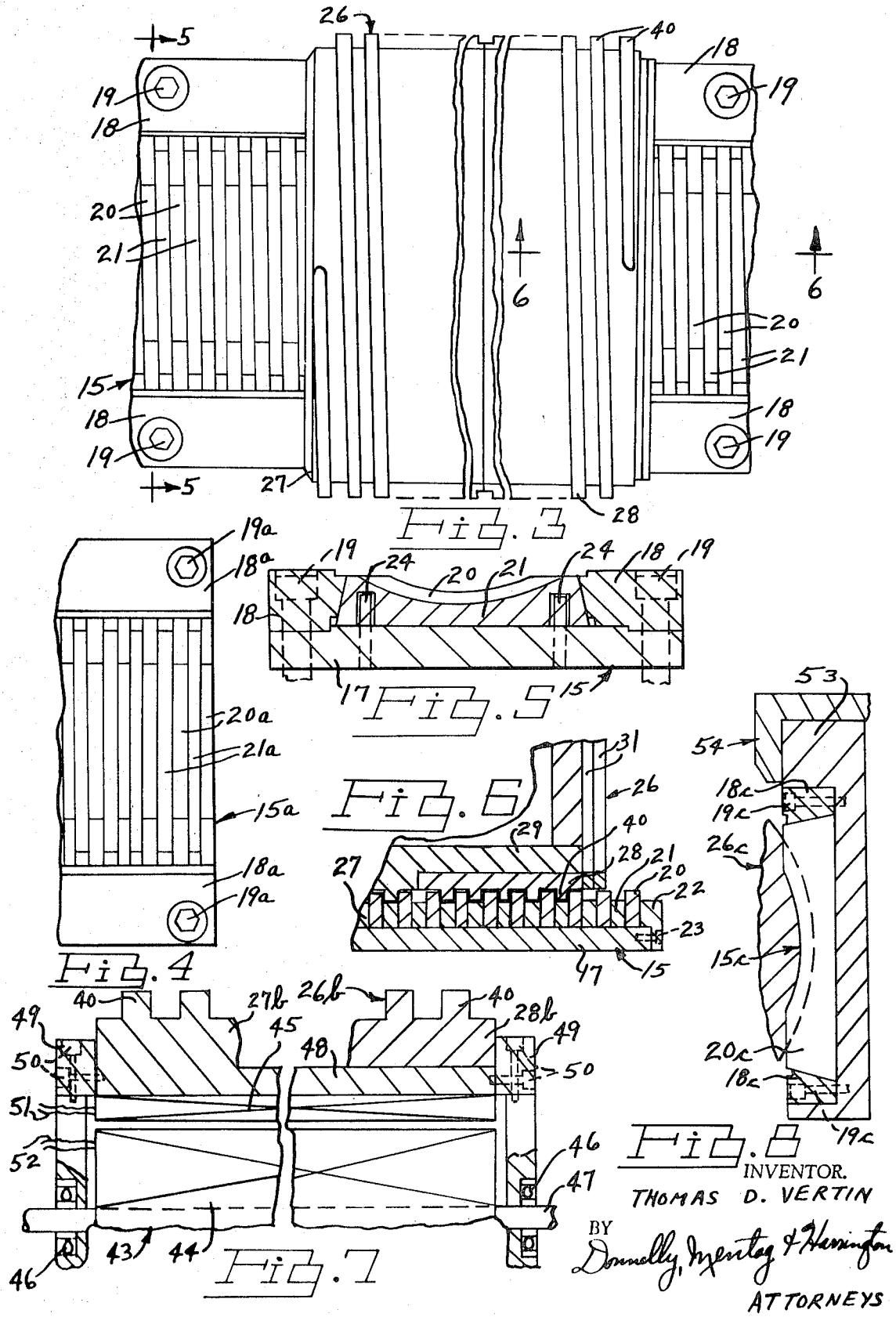

INVENTOR.
THOMAS D. VERTIN
BY
ATTORNEYS

United States Patent Office 3,720,114
Patented Mar. 13, 1973

3,720,114
MACHINE ELEMENT DRIVE MEANS INCLUDING A GEAR RACK ASSEMBLY OF INDIVIDUAL SQUARE TEETH
Thomas D. Vertin, 37540 Lake Shore Road, Mount Clemens, Mich. 48043
Filed Feb. 16, 1971, Ser. No. 115,598
Int. Cl. F16h *1/18, 1/04, 55/08*
U.S. Cl. 74—424.6
21 Claims

ABSTRACT OF THE DISCLOSURE

A machine element drive means for moving one machine element, as a column, relative to another machine element, as a base, including a gear rack means on one of said machine elements and a rotatable drive worm on the other of said machine elements in driving engagement with the gear rack means, whereby when said drive worm is rotated, a relative movement between the machine elements is produced. The gear rack means is formed from a plurality of individual square teeth.

SUMMARY OF THE INVENTION

This invention relates generally to a drive means for a machine tool and more particularly to a drive means for moving one machine element relative to another machine element.

The provision of a drive worm and gear rack drive means is known in the machine tool art for moving one machine element relative to another machine element. A disadvantage of such known machine element drive means is that the tolerances between the meshing parts of the drive worm and the gear rack permit excessive movement of one machine element relative to another during reversal movements. Such excess movement of one machine element relative to another presents a problem in a machine which is operative for moving a tool over a workpiece having a curved surface or contour wherein the movable machine element carrying the tool is reversed in a number of directions during the travel of the tool over the workpiece. Another disadvantage of the prior art gear rack means for a machine tool drive means is that special machines are needed to produce them and much time is required. Furthermore, the length to which a prior art gear rack can be made is limited since extremely long prior art gear racks tend to warp. Still another disadvantage of the prior art drive worm and gear rack drive means is that a large amount of power is required to initiate movement between the machine elements and to brake them.

The prior art drive worm and gear rack drive apparatuses develop a side thrust which is a disadvantage. The prior art drive worms, because of the small diameters employed, cannot provide fine resolutions or increments of travel. A further inherent disadvantage of the prior art worm and gear rack drive apparatuses is that only one tooth of the worm is in contact at any one time with the gear rack, so that only a single line contact is provided between the worm and the gear rack. The prior art worm and gear rack drive apparatuses require pressure to hold the worm in place on the gear rack, and such structures require a predetermined amount of backlash which results in interrupted cuts when the worm is reversed relative to the gear rack. A still further disadvantage of the prior art worm and gear rack drive apparatuses is that the worm in such apparatuses is of a small diameter and of a long length whereby, when the movement of a machine element is reversed, the long worm goes through an unwinding and winding effect which permits the movable machine element to stand still for a short period of time so that the working cut is interrupted and the tool is stationary relative to the workpiece, and a work hardening effect is created on the metal at that point. A further disadvantage of the prior art worm and gear rack drive apparatuses is that, because of the need for a backlash between the worm and gear rack, it is not possible to preload the worm relative to the gear rack, and therefore it is not possible to obtain a micro-finish on the workpiece. A still further disadvantage of the prior art worm and gear rack drive apparatuses is that, because of the friction involved between the worm and the gear rack, the mating surfaces must be of different degrees of hardness, so that one surface is softer than the other mating surface. In view of the foregoing, it is an important object of the present invention to provide a novel and improved machine element drive means which overcomes the aforedescribed disadvantages of the prior art machine element drive means.

It is another object of the present invention to provide a novel and improved machine element drive means which is compact and simple in construction, economical to manufacture and efficient in operation.

It is still another object of the present invention to provide a novel and improved machine element drive means which includes a gear rack which can be made precisely to any desired length, and which has no backlash or override so that a machine element can be moved with zero backlash and with a minimum of power for initiating movement of a machine element and for braking the machine element. The drive means is constructed and arranged to provide a minimum of wear between a drive worm and the gear rack, and to provide high accuracy which can be maintained over longer periods of time than is heretofore possible with the prior art drive means.

It is still another object of the present invention to provide a novel and improved machine element drive means comprising a drive worm having teeth which are meshed with square teeth formed on the gear rack means. The drive worm is formed from two parts to permit positive reversal action without excessive movement of a machine element when the drive means is reversed. The drive worm may be operatively mounted on the rotor of an electric motor for driving the drive worm. The square teeth on the gear rack may be formed from a plurality of separately formed tooth plates which are spaced apart by suitable spacer blocks so that the gear rack may be made to any desired length by using the desired number of tooth plates and spacer blocks. The two parts of the drive worm may be adjusted relative to each other to provide a preload pressure on the worm and gear rack to hold these parts together. The preload pressure on the worm and gear rack may be adjusted to or above the cutting tool load whereby, when a machine element is reversed in the course of a cutting action, there is no interruption in the cut on the workpiece being made by the tool, and there is no winding up and unwinding effect or torsion encountered in the drive worm. The drive worm may be made to a short length and with a large diameter so as to provide a fine resolution or increment of travel as, for example, a one-degree rotation of the drive worm may produce a .001″ movement. The preloading of the drive worm on the gear rack of the present invention provides a plurality of lines of contact between the drive worm and the gear rack, and the side thrust is minimized and it is evenly distributed in the direction of travel on the gear rack. The drive worm may be made to a length much shorter than the prior art drive worms. The preloading of the worm on the gear rack permits a machine tool provided with the present invention to microfinish surfaces of a workpiece, and the mating surfaces or contacting surfaces are hardened precision parts which are of equal degrees of hardness, because no friction is inherent in the worm and gear rack drive of the present invention. The worm in the drive means of the present invention may be driven by an in-line motor which may be internally disposed relative to the drive worm or externally disposed, so as to provide no lost motion which results in fine resolution or increments of movement.

It is a further object of the present invention to provide a gear rack drive means for moving one machine element relative to another machine element and which includes a first part comprising a gear rack means on one of the machine elements and which is provided with a plurality of teeth, a second part comprising a rotatable drive worm operatively mounted on the other of the machine elements and having teeth in meshing driving engagement with said gear rack means whereby when said drive worm is rotated in said gear rack means a relative movement between said machine elements is produced. Each of said drive means parts is provided with square teeth.

Other objects, features and advantages of this invention will be apparent from the following detailed description, appended claims, and the accompanying drawings.

BRIEF DESCRIPTION OF THE DRAWINGS

FIG. 3 is a fragmentary, enlarged, broken, elevational view of the structure illustrated in FIG. 1, taken along the line 3—3 thereof, and looking in the direction of the arrows.

FIG. 4 is a fragmentary, plan view of a modified gear rack means, showing the gear rack teeth disposed perpendicular to the longitudinal axis of the gear rack means.

FIG. 5 is a fragmentary, elevational, section view of the structure illustrated in FIG. 3, taken along the line 5—5 thereof, and looking in the direction of the arrows.

FIG. 6 is a fragmentary, enlarged, broken, elevational section view of the structure illustrated in FIG. 3, taken along the line 6—6 thereof, and looking in the direction of the arrows.

FIG. 7 is a fragmentary, broken, longitudinal, section view of an electric motor and drive worm mounted on the rotor.

FIG. 8 is a fragmentary, elevational view of a machine way, and illustrating the incorporation of the gear rack and gear teeth as a part of the machine way.

DESCRIPTION OF THE PREFERRED EMBODIMENTS

Figure 1:
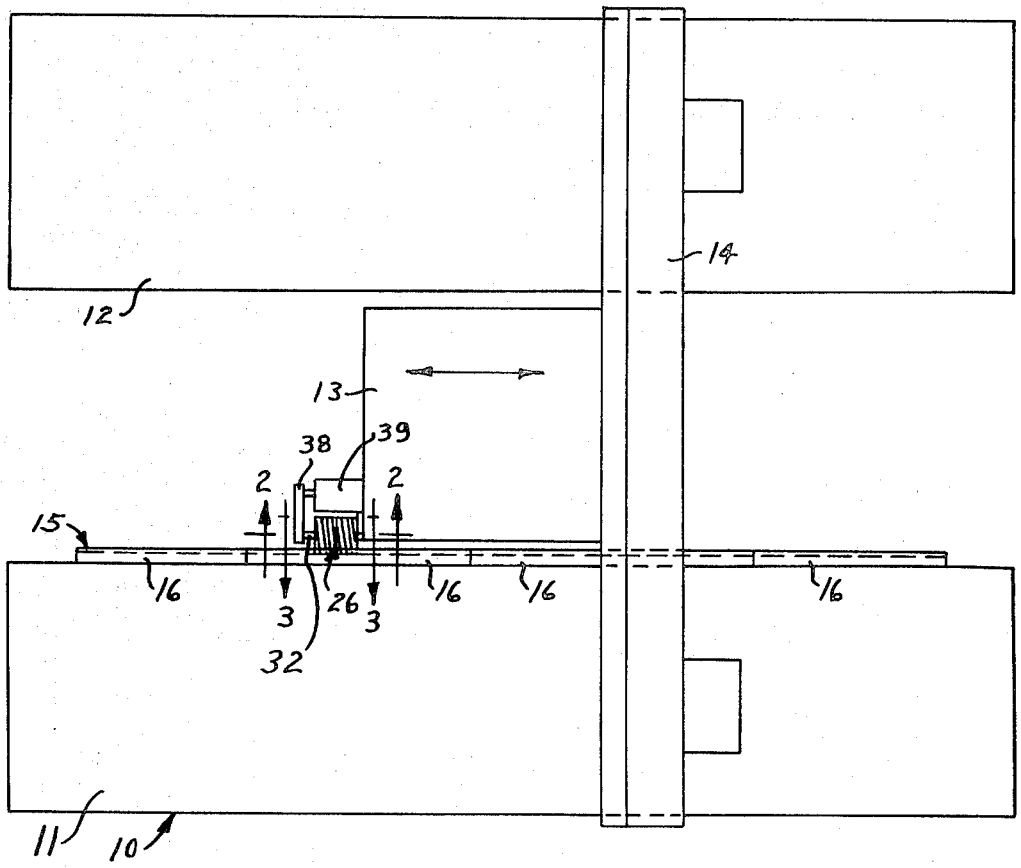
FIG. 1 is a top plan view of a machine tool provided with an illustrative embodiment of the invention.

Referring now to the drawings, and in particular to FIG. 1, the numeral 10 generally designates a milling machine provided with a pair of stationary tables 11 and 12, a movable vertical machine column 13 and a bridge 14. The details of the machine have not been shown since they do not form any part of the invention. It will be further understood that the drive means of the present invention may be incorporated in any machine, and that it can be used for moving machines elements on a horizontal plane, a vertical plane or on an angular plane relative to the horizontal and vertical planes.

The numeral 15 generally designates a gear rack means made in accordance with the principles of the present invention, and it is mounted on one of the machine elements, namely the stationary table 11. The gear rack means 15 may be made to any desired length, and it may be made in sections, as indicated by the numerals 16.

As shown in FIG. 5, the gear rack means 15 includes an elongated mounting plate 17, which is secured to the stationary machine element 11 by a pair of keepers 18 and a plurality of socket head screws 19. As shown in FIGS. 3 and 6, the gear rack means 15 includes a plurality of block teeth 20 which are made in the form of square plates. The square gear rack teeth 20 are secured between the keepers 18 and are longitudinally spaced apart by spacer plates 21. A shown in FIG. 6, the square teeth 20 and the spacer plates 21 are secured on the mounting plate 17 at each end thereof, by any suitable means, as by an end clamp 22 which is secured to the mounting plate 17 by suitable socket head screws 23. Dowel pins 24 (FIG. 5) may also be used to secure the gear rack spacer plates 21 in place.

The square teeth plates 20 and the spacer plates 21 are made from a suitable hardened steel, and it will be seen that any number of teeth plates 20 and spacer plates 21 can be used to make a gear rack means 15 of any desired length. It will be understood that the spacing of the teeth plates 20 relative to each other can be adjusted by merely grinding off the necessary amount of material from the spacer plates 21. The tolerance between the teeth plates 20 can thus be adjusted and kept to a minimum so as to permit positive reversal of a machine element which is driven by the drive means of the present invention. The gear rack means 15 of the present invention may be made more quickly than gear racks incorporating conventional teeth. FIG. 3 shows the tooth plates 20 being disposed at a helix angle relative to the longitudinal axis of the gear rack. It will be understood that any desired helix angle may be used as, for example, a helix angle of 1°, 8 minutes and 22 seconds.

It will be understood that the square tooth gear rack means 15 provides a gear rack means with no backlash and no override. An advantage of the gear rack means 15 is that the square teeth plates 20 and the spacer plates 21 may be used as standard items for the stocking of these parts, so that a gear rack means 15 can be quickly and easily made and delivered in a minimum of time after an order for the same. Another advantage of the gear rack means 15 over the prior art type gear racks is that it does not need a large amount of maintenance which results in less down-time and cheaper maintenance.

FIG. 4 is a fragmentary plan view of a modified gear rack means 15a showing the gear rack teeth 20a disposed perpendicular to the longitudinal axis of the gear rack means. The parts of the modified structure of FIG. 4 which are the same as the structure illustrated in FIGS. 3 and 5, have been marked with the same reference numerals followed by th small letter a.

Figure 2:
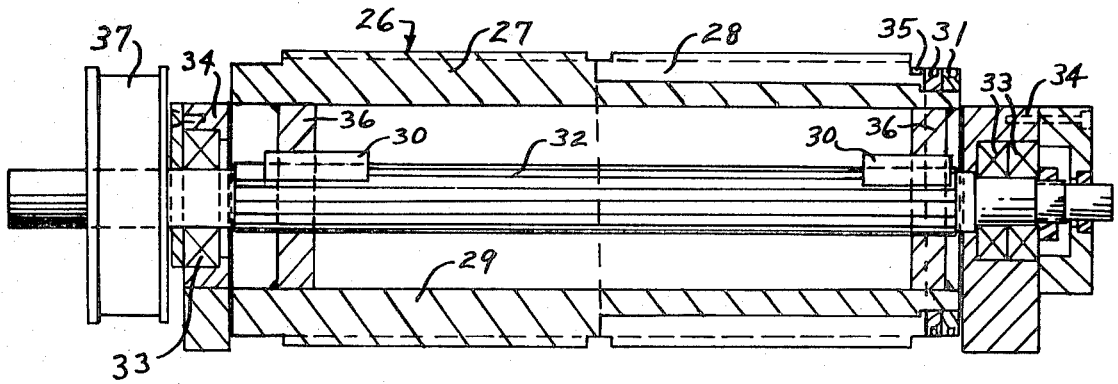
FIG. 2 is a fragmentary, enlarged, elevational, section view of the structure illustrated in FIG. 1 taken along the line 2—2 thereof, and looking in the direction of the arrows.

As shown in FIG. 1, the vertical column 13 carries a rotatable drive worm 26 which is adapted to operatively engage the gear rack means 15 for moving the machine element 13 relative to the stationary machine elements 11 and 12. As shown in FIG. 2, the drive worm 26 generally includes the two parts or tooth portions 27 and 28. The drive worm part 28 can be rotatable adjusted relative to the part 27 and axially spaced by suitable shims to eliminate any backlash and override when the machine element 13 is reverse in its movement relative to the stationary machine elements 11 and 12. The drive worm tooth portions 27 and 28 in FIG. 2 have been schematically shown without indicating any particular type of the thread tooth. As shown in FIGS. 3 and 6, the drive worm 26 is provided with square teeth 40 on each of the tooth portions 27 and 28 for meshing engagement with the teeth 20 on the gear rack means 15. The teeth 40 are formed on any suitable helix angle, as, for example, a helix angle of 1°, 8 minutes and 22 seconds.

The tooth carrying drive worm part 27 is formed as an integral part of a cylindrical body 29. The drive worm part 28 is rotatably mounted on the cylindrical body 29 and held in a selected axially adjusted position by suitable lock collars 31. The drive worm body 29 is operatively mounted by the affixed annular plates 36 on a shaft 32 which is rotatably mounted on suitable ball bearing means 33. The cylindrical body 29 is secured to the shaft 32 by any suitable means, as by the keys 30 engaging the plates 36. The drive worm part 28 may be rotatably adjusted by suitable means, as by a spanner wrench engaged in the socket 35. The bearing means 33 are operatively mounted in support members 34 which are secured to the vertical column 13 by any suitable means. A belt pulley 37 is fixedly secured to one end of the drive worm shaft 32. As shown in FIG. 1, a drive belt 38 is operatively mounted over the pulley 37 and a similar pulley on the output drive shaft of a suitable reversible drive motor 39, as for example, an electric motor. The motor 39 is secured by any suitable means to the vertical column 13.

FIG. 7 is a fragmentary, schematic longitudinal section view of a reversible electric motor having a drive worm 26b operatively mounted on the rotor of the electric motor. The details of the motor have been generally indicated and it will be understood that any suitable, reversible electric motor of this type may be employed. The parts of the drive worm structure which are the same as the drive worm structure illustrated hereinbefore have been marked with the same reference numerals followed by the small letter b. The numeral 43 generally indicates the electric motor which is provided with a stationary internal stator and a rotatable external rotor 45. The rotor 45 is carried on a housing which is rotatably mounted on suitable bearing means 46 on a motor shaft 47. The drive worm part 27b is integrally formed on a cylindrical rotor sleeve 48 and the drive worm part 28b is separately formed and rotatably mounted on the rotor sleeve 48. The sleeve 48 is held on said housing by a pair of lock rings 49 and a plurality of suitable socket head screws 50. One of the lock rings 49 also functions to hold the drive worm part 28b in an adjusted position relative to the drive worm part 27b. The drive worm 26b would function in the same manner as the previously described drive worm 26. The stator 44 and the rotor 45 would be operatively connected to a suitable power source by suitable leads as 51 and 52.

FIG. 8 illustrates the forming of a gear rack means 15c on a machine way 53. The numeral 54 generally designates a machine element slidably mounted on the machine way 53. The parts of the gear rack means 15c shown in FIG. 8 which are the same as the previously described embodiments are marked with the same reference numerals followed by the small letter c.

Figure 9:
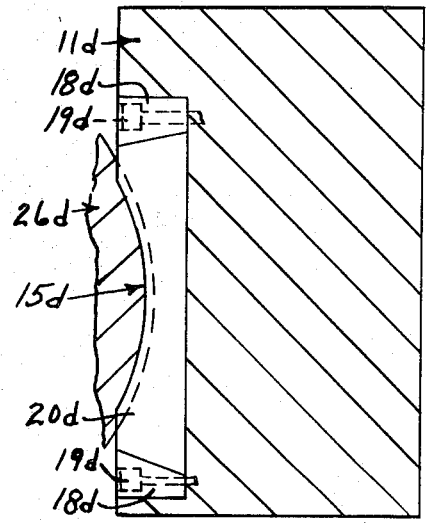
FIG. 9 is a fragmentary, elevational view of a machine tool part and illustrating the incorporation of the gear rack means as a part of a machine element.

FIG. 9 is a fragmentary, elevational view of a machine tool element such as a stationary machine table 11d which has been provided with a gear rack means 15d. The gear rack means 15d is incorporated as a part of the machine element 11d. The parts of the gear rack means 15d which are the same as the gear rack means of FIGS. 3 and 6 have been marked with the same reference numerals followed by the small letter d.

Figure 10:
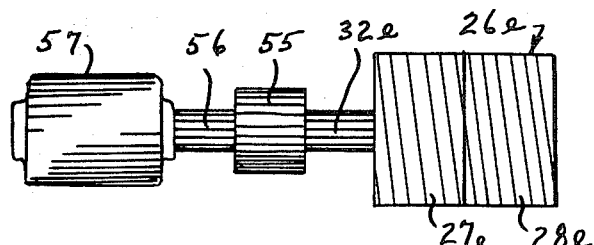
FIGS. 10 and 11 illustrate two types of in-line drive motors for the drive worm.

FIG. 10 illustrates a first type of in-line drive motor for driving a drive worm made in accordance with the principles of the present invention. The numeral 26e designates generally drive worm made in accordance with the principles of the present invention and which includes the two drive worm parts 27e and 28e. The drive worm shaft 32e is operatively connected by a suitable coupling 55 to the output drive shaft 56 of a suitable reversible electric motor 57.

Figure 11:
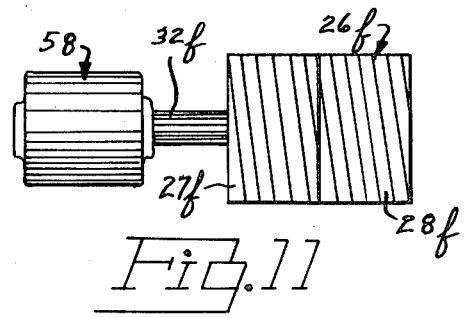

FIG. 11 illustrates a second type of in-line drive motor for driving a drive worm made in accordance with the principles of the present invention. The numeral 26f designates generally a drive worm made in accordance with the principles of the present invention and which includes the two drive worm parts 27f and 28f. The drive worm shaft 32f is integrally connected to the output drive shaft of a suitable reversible electric motor 58. The direct mounting of the motor 58 and the drive worm 26f on the common shaft 32f eliminates any chance of lost movement between the drive motor 58 and the drive worm 26f.

Both of the aforedescribed drive worm means operate with their respective gear rack means to drive one machine element relative to another in an efficient manner. Experience has shown that a machine provided with a drive means of the present invention may be operated with a minimum of power and that a machine element can also be braked relative to another machine element with a minimum of power.

The side thrust which is present in the prior art worm drive and gear rack means is minimized in the structure of the present invention since the thrust generated is evenly distributed in the direction of travel on the rack means. It will be seen that the drive worm part 28 can be rotatably adjusted on the cylindrical body 29 so as to provide a pre-load pressure by the drive worm on the gear rack to hold these parts together. It will be understood that spacing shims may also be disposed between the inner ends of the drive worm parts 27 and 28 for adjusting the pre-load pressure as desired. As viewed in FIG. 6, the pre-load on the gear rack teeth 20 would thus be imposed by the drive worm part 27 exerting a constant longitudinally directed pressure to the left as viewed in FIG. 6, against the mating gear rack teeth 20 and the drive worm part 28 exerting a constant longitudinally directed pressure to the right in the opposite direction against the mating gear rack teeth 20.

The pre-load pressure on the drive worm and gear rack means may be adjusted up to or above the cutting tool load. The pre-load would be adjusted in accordance with the heaviest cut. It will be understood that the pre-load could be adjusted to provide for different cutting tool loads which would vary in accordance with the type of cutting tool and the material of the workpiece. Also, it will be understood that the drive means of the present invention could be used on drafting machines whereby the pre-load would be lower than when the invention is used on a metal working machine or a wood working machine.

The pre-load pressure on the drive worm and gear rack means eliminates any interruption in the cutting action of a tool on a workpiece when a machine element carrying the tool or workpiece is reversed, as in contour cutting. The prior art drive worms are long and of a small diameter and a winding up and unwinding torsion effect is created when the prior art drive worms are reversed. This disadvantageous effect is not present in the drive worm and gear rack means of the present invention because of the aforementioned pre-load and the fact that the drive worm of the present invention is made to a short length and with a large diameter. The short length drive worm and large diameter also provides a fine resolution or increment of travel which is not possible with the prior art drive means. A further advantage of the pre-load pressure on the drive worm and gear rack of the present invention is that no other pressure is needed to maintain contact between the drive means members so as to minimize friction and provide a plurality of lines of contact between the drive worm and the gear rack means. The preload feature of the present invention also permits a machine tool provided with the drive means of the present invention to micro-finish surfaces of a workpiece, and the mating surfaces or contacting surfaces of the drive worm and gear rack means may be hardened to equal degrees of hardness because of the minimum friction characteristic of the drive means of the present invention. It will be understood that in the prior art devices, one of the mating surfaces on the drive worm and gear rack means is always provided with a harder surface than the other mating surface. The in-line drive means of the present invention provides a power drive means for the drive worm which eliminates lost motion normally inherent in the prior art drive means, and this feature further adds to the fine resolution or increment of travel obtainable from a drive means made in accordance with the present invention. It will be understood that the tables 11 and 12 are conventional workpiece and model or template supporting tables and that the cutting tool and tracer mechanism is carried by the machine element 14.

While it will be apparent that the preferred embodiments of the invention herein disclosed are well calculated to fulfill the objects above stated, it will be appreciated that the invention is susceptible to modification, variation and change.

What I claim is:

1. In a machine element drive means for moving one machine element relative to another machine element, the combination including:
   (a) a first part comprising a gear rack means on one of said machine elements and being provided with a plurality of square teeth;
   (b) a second part comprising a rotatable drive worm means operatively mounted on the other of said machine elements and in meshing driving engagement with said gear rack means, whereby when said drive worm means is rotated in said gear rack means a relative movement between said machine elements is produced; and
   (c) said drive worm means including:
      (1) two drive worm parts; and,
      (2) means for rotatably adjusting the drive worm parts relative to each other and for releasably securing said two drive worm parts together to provide a preload pressure by said drive worm parts on the gear rack means.

2. A machine element drive means as defined in claim 1, wherein:
   (a) a plurality of lines of driving contact are provided between said drive worm and gear rack means.

3. A machine element drive means as defined in claim 1, wherein:
   (a) one of said drive worm parts is adjustably rotatable relative to the other of said drive worm parts.

4. A machine element drive means as defined in claim 1, wherein:
   (a) the preload pressure between the drive worm and the gear rack means may be adjusted up to and above the cutting tool load.

5. A machine element drive means as defined in claim 1, including:
   (a) power drive means connected to said drive worm means for rotating the drive worm.

6. In a machine element drive means for moving one machine element relative to another machine element, the combination including:
   (a) a first part comprising a gear rack means on one of said machine elements and being provided with a plurality of square teeth;
   (b) a second part comprising a rotatable drive worm means operatively mounted on the other of said machine elements and in meshing driving engagement with said gear rack means, whereby when said drive worm means is rotated in said gear rack means a relative movement between said machine element is produced;
   (c) power drive means connected to said drive worm means for rotating the drive worm means; and,
   (d) said power drive means comprising:
      (1) an electric motor having a stator armature and a rotor winding member; and,
      (2) said drive worm means is operatively mounted on said rotor winding member.

7. In a machine element drive means for moving one machine element relative to another machine element, the combination including:
   (a) a first part comprising a gear rack means on one of said machine elements and being provided with a plurality of square teeth;
   (b) a second part comprising a rotatable drive worm means operatively mounted on the other of said machine elements and in meshing drive engagement with said gear rack means, whereby when said drive worm means is rotated in said gear rack means a relative movement between said machine elements is produced;
   (c) power drive means connected to said drive worm means for rotating the drive worm; and,
   (d) said power drive means comprising:
      (1) an electric motor mounted on said other of said machine elements; and,
      (2) a pulley and drive belt means operatively connecting said electric motor to said drive worm means.

8. A machine element drive means as defined in claim 5, wherein said power drive means comprises:
   (a) an electric motor having a drive shaft coupled in alignment with a shaft rotatably supporting the drive worm means.

9. A machine element drive means as defined in claim 5, wherein said power drive means comprises:
   (a) an electric motor having a drive shaft integrally connected to a shaft rotatably supporting said drive worm means.

10. A machine element drive means as defined in claim 1, wherein:
    (a) the drive worm means surfaces meshing with and engaging the gear rack means, and the teeth on the gear rack means are hardened to an equal degree.

11. In a machine element drive means for moving one machine element relative to another machine element, the combination including:
    (a) a first part comprising a gear rack means on one of said machine elements and being provided with a plurality of square teeth;
    (b) a second part comprising a rotatable drive worm means operatively mounted on the other of said machine elements and in meshing driving engagement with said gear rack means, whereby when said drive worm means is rotated in said gear rack means a relative movement between said machine elements is produced;
    (c) each of said gear rack means square teeth being made separately; and,
    (d) said separately made square teeth being assembled together to comprise said gear rack means.

12. A machine element drive means as defined in claim 11, wherein:
    (a) each of said separately made gear rack means square teeth is made as a separate flat plate.

13. A machine element drive means as defined in claim 12, including:
    (a) spacer means for spacing apart said separately made square teeth flat plates.

14. A machine element drive means as defined in claim 13, wherein said gear rack means comprises:
    (a) a mounting block secured to said one machine element;
    (b) said plurality of square teeth flat plates being mounted on said block and spaced by said spacer means; and,
    (c) locking means for releasably locking said square teeth flat plates to said block.

15. A machine element drive means as defined in claim 14, wherein:
    (a) said spacer means comprises a plurality of spacer members.

16. A machine element drive means as defined in claim 15, wherein:
    (a) said plurality of spacer members comprise a plurality of spacer plates.

17. A machine element drive means as defined in claim 14, wherein:
    (a) said square teeth flat plates are disposed perpendicular to the longitudinal axis of the gear rack means, 18. A machine element drive means as defined in claim 14, wherein:
   (a) said square teeth flat plates are disposed nonperpendicular relative to the longitudinal axis of the gear rack means.
19. A machine element drive means as defined in claim 1, wherein:
   (a) said gear rack means is formed on a machine element way.
20. A machine element drive means as defined in claim 1, wherein:
   (a) said gear rack means is formed on a machine element.
21. A machine element drive means as defined in claim 1, wherein:
   (a) said drive worm means is provided with a plurality of square teeth.

References Cited

UNITED STATES PATENTS

| | | | |
|---|---|---|---|
| 129,339 | 7/1872 | Hawkes | 74—424.6 X |
| 3,301,081 | 1/1967 | Kern, Jr. | 74—421 A |
| 1,753,778 | 4/1930 | Drader | 74—422 |

LEONARD H. GERIN, Primary Examiner

U.S. Cl. X.R.

74—422, 439, 447, 458